United States Patent
Chiyoda et al.

(10) Patent No.: US 10,794,801 B2
(45) Date of Patent: Oct. 6, 2020

(54) CELL STAINING METHOD AND SAMPLE COLLECTION TUBE USED FOR THE SAME

(71) Applicant: Konica Minolta Inc., Tokyo (JP)

(72) Inventors: Tsuneko Chiyoda, Tokyo (JP); Jungo Araki, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 527 days.

(21) Appl. No.: 14/890,506

(22) PCT Filed: Mar. 24, 2014

(86) PCT No.: PCT/JP2014/058029
§ 371 (c)(1),
(2) Date: Nov. 11, 2015

(87) PCT Pub. No.: WO2014/185151
PCT Pub. Date: Nov. 20, 2014

(65) Prior Publication Data
US 2016/0123851 A1    May 5, 2016

(30) Foreign Application Priority Data
May 13, 2013 (JP) ................... 2013-101206

(51) Int. Cl.
*G01N 1/30* (2006.01)
*G01N 1/31* (2006.01)

(52) U.S. Cl.
CPC ................ *G01N 1/30* (2013.01); *G01N 1/31* (2013.01); *G01N 2001/305* (2013.01)

(58) Field of Classification Search
None
See application file for complete search history.

(56) References Cited

U.S. PATENT DOCUMENTS

| | | | | |
|---|---|---|---|---|
| 6,143,576 A * | 11/2000 | Buechler | ............. | B01J 19/0093 422/412 |
| 2003/0166273 A1 * | 9/2003 | Kaufman | ................ | C12N 5/069 435/366 |
| 2004/0014107 A1 * | 1/2004 | Garcia-Blanco | ....... | C07K 16/10 435/6.14 |
| 2004/0197836 A1 * | 10/2004 | Hashemi | .......... | C01N 33/56972 435/7.21 |
| 2004/0229368 A1 | 11/2004 | Rubio et al. | | |
| 2007/0243601 A1 * | 10/2007 | Korpimaki | .......... | B01L 3/50851 435/287.9 |
| 2009/0028833 A1 * | 1/2009 | John | .................... | C12N 5/0683 424/93.7 |
| 2010/0167271 A1 * | 7/2010 | Ryan | ................ | G01N 33/56972 435/5 |
| 2012/0128698 A1 | 5/2012 | van Lookeren Campagne | | |
| 2014/0148354 A1 | 5/2014 | Campana | | |

FOREIGN PATENT DOCUMENTS

| | | | | |
|---|---|---|---|---|
| EP | 0073551 A2 * | 3/1983 | ......... | A61B 10/0096 |
| EP | 0317085 A2 * | 5/1989 | .......... | G01N 33/556 |
| EP | 0562877 A2 | 9/1993 | | |
| JP | 2008256713 A | 10/2008 | | |
| JP | 2009525468 A | 7/2009 | | |
| JP | 2012532873 A | 12/2012 | | |
| WO | 2009065226 A1 | 5/2009 | | |
| WO | 2012134813 A1 | 10/2012 | | |
| WO | 2013067268 A1 | 5/2013 | | |

OTHER PUBLICATIONS

Extended European Search Report dated Dec. 15, 2016 from the corresponding European Application No./Patent No. 14798175.7-1554; Applicant: Konica Minolta, Inc.: Total of 7 pages.
Maria C. Jamur, et al; Permeabilization of cell membranes; Methods in Molecular Biology; vol. 588; 2010; pp. 63-66.
International Search Report dated Jun. 24, 2014 for PCT/JP2014/058029 and English translation.
Japanese Office Action and english translation, 2015-516978, dated Oct. 10, 2017.

* cited by examiner

*Primary Examiner* — Ellen J Marcsisin
(74) *Attorney, Agent, or Firm* — Lucas & Mercanti, LLP

(57) ABSTRACT

An object of the present invention is, in the case when a specific substance that has expressed on cells to be detected in a liquid sample is to be specifically stained, to provide a convenient cell staining method by which the damage and loss (flow out) of the cells in the collected sample are prevented, and the time has been shortened in a procedure for staining the cells in the liquid sample. Furthermore, another object of the present invention is to provide a sample collection tube that is suitable for use in the above-mentioned cell staining method. A method for specifically staining a specific substance possessed by cells in a sample, including performing the following steps in one step: (A) a step of performing an immobilization treatment of the cells; and (B) a step of performing a permeabilization treatment of the cells.

11 Claims, 3 Drawing Sheets

AN ASPECT OF THE SAMPLE COLLECTION TUBE OF THE PRESENT INVENTION

FIG. 2
THE FLUORESCENT-STAINED IMAGES OF THE CELLS IN THE BLOOD TO WHICH MCF-7 CELLS (BREAST CANCER CELLS) HAD BEEN ADDED (COMPARATIVE EXAMPLE)

MCF-7 CELLS (STAINED WITH A FITC-LABELED ANTICYTOKERATIN ANTIBODY)

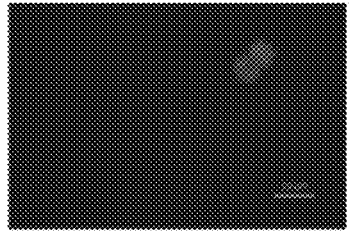

THE WHOLE CELL NUCLEI (NUCLEUS STAINING WITH HOECHST)

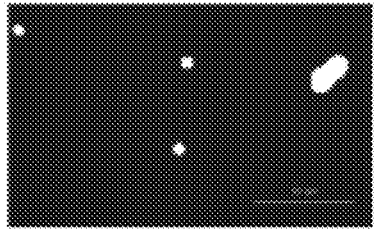

LEUCOCYTES (STAINED WITH A PE-LABELED ANTI-CD45 ANTIBODY)

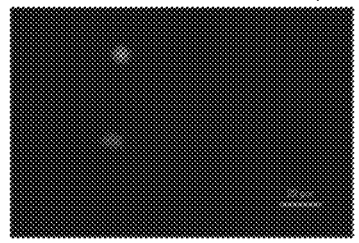

Merge

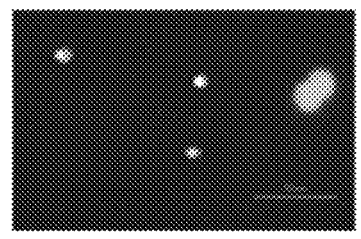

FIG. 3
THE FLUORESCENT-STAINED IMAGES OF THE CELLS IN THE BLOOD TO WHICH MCF-7 CELLS (BREAST CANCER CELLS) HAD BEEN ADDED (EXAMPLE 1)

MCF-7 CELLS (STAINED WITH A FITC-LABELED ANTICYTOKERATIN ANTIBODY)

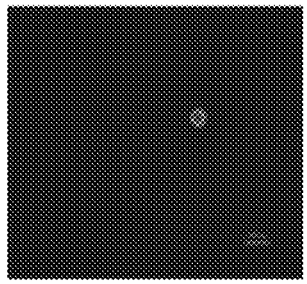

THE WHOLE CELL NUCLEI (NUCLEUS STAINING WITH HOECHST)

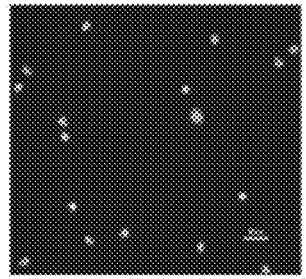

LEUCOCYTES (STAINED WITH A PE-LABELED ANTI-CD45 ANTIBODY)

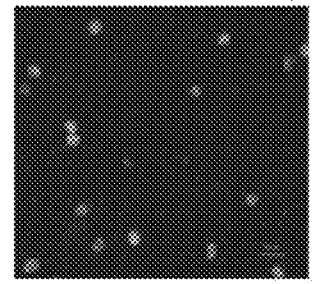

Merge

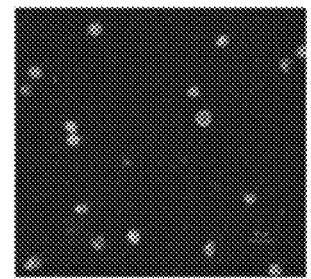

FIG. 4
THE FLUORESCENT-STAINED IMAGES OF THE CELLS IN THE BLOOD TO WHICH MCF-7 CELLS (BREAST CANCER CELLS) HAD BEEN ADDED (EXAMPLE 2)
MCF-7 CELLS (STAINED WITH A FITC-LABELED ANTICYTOKERATIN ANTIBODY)
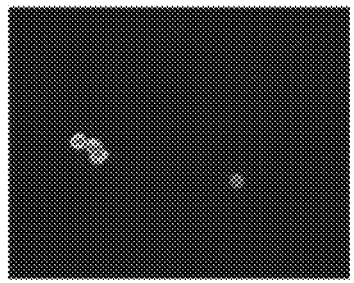
THE WHOLE CELL NUCLEI (NUCLEUS STAINING WITH HOECHST)
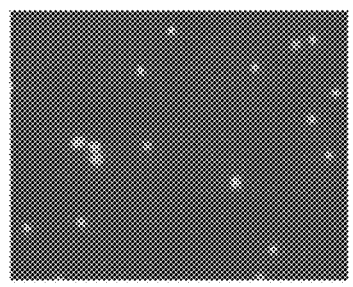
LEUCOCYTES (STAINED WITH A PE-LABELED ANTI-CD45 ANTIBODY)
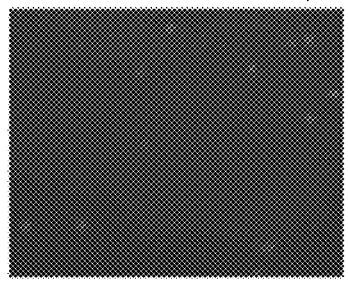
Merge
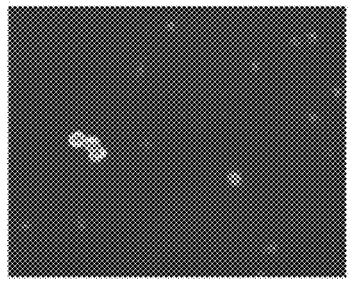

CELL STAINING METHOD AND SAMPLE COLLECTION TUBE USED FOR THE SAME

CROSS REFERENCE TO RELATED APPLICATION

This Application is a 371 of PCT/JP2014/058029 filed on Mar. 24, 2014 which, in turn, claimed the priority of Japanese Patent Application No. JP2013-101206 filed on May 13, 2013, both applications are incorporated herein by reference.

TECHNICAL FIELD

The present invention relates to a method for staining a cell and a sample collection tube used for this method. More specifically, the present invention relates to a method for the cell immobilization, permeabilization and/or labeling of a cell in cell staining, and a sample collection tube used for the method for the cell immobilization, permeabilization and/or labeling.

BACKGROUND ART

Cell diagnoses, in which the presence or absence of a pathological change is judged by observing cells collected from a body of a human or an animal, have been performed. For example, blood contains blood cells, and mucosae of organs, mucus, sputum, ascites, gastric juice, urine and the like contain cells that have been peeled from organs. In cell diagnoses, these cells are collected and stained, and observed under a microscope or the like. In these cases, for example, circulating tumor cells (CTC), blood vessel endothelial cells, blood vessel endothelial precursor cells, various stem cells and the like (hereinafter referred to as "rare cells") are cells that are present in fairly infrequently present in peripheral blood depending on pathological conditions, and thus it is clinically useful to detect these rare cells. However, the amounts of rare cells contained in samples are very small, and thus it is still difficult in many cases to detect rare cells from blood-derived samples.

On the other hand, in cell diagnoses, collected cells are generally immobilized, permeabilized and then stained, and observed under a microscope or the like. Generally, in this procedure, plural steps such as collection of a sample, preparation of a cell suspension liquid (mainly in the cases of liquid samples such as blood and urine (separation of an intended cell fraction is included)), immobilization and washing of cells, permeabilization of the cells, and staining and washing of the cells are sequentially performed, and the stained cells are observed under a microscope or the like. Furthermore, as a staining method for detecting specific cells, for example, a pigment staining process, an antigen-antibody process including reacting with a specific substance that is expressed in cells to be detected, or the like is used.

As an example of such procedure, in Patent Literature 1, for the purpose of detecting cells in blood, an anticoagulant and blood are reacted, hemolysis is performed, the residual cell suspension liquid is incubated on an adhesive substrate at 37° C. for 40 minutes to thereby allows the cells to adhere, and the cells are then immobilized with paraformaldehyde, washed twice, subjected to a cell permeabilization treatment, washed, and reacted with an antibody (paragraph 0075 of Patent Literature 1). However, such procedure is complex and includes plural times of centrifugation, washing and the like, and thus the rare cells in the sample may be damaged or flow out.

Furthermore, Patent Literature 2 describes that lysis of cells (including erythrocytes) of a predetermined type in a sample (including in a blood sample), staining of an intracellular nucleic acid, and immobilization of nucleated cells are performed in a single stage, whereby the cost, time and the like of the analysis are decreased (claims and the like of Patent Literature 2). However, in this method, the cells that are lysed by a cytolytic agent are erythrocytes, which are cells other than the cells to be detected; and in the staining, the entirety of the intracellular nucleic acid is stained by a nucleic acid staining pigment, and the specific substance expressed on the cells to be detected is not specifically stained.

Accordingly, in order to surely detect cells to be detected which are contained in small amounts in samples, especially rare cells, a method by which damage and flow out of cells in a collected sample are prevented, and which enables specific staining of a specific substance that has expressed on cells to be detected is desired.

Furthermore, as mentioned above, since the procedures of conventional cell staining are complex, simplification and shortening of the time of the procedures are desired.

CITATION LIST

Patent Literatures

Patent Literature 1: JP 2009-525468 T
Patent Literature 2: JP 2008-256713 A

SUMMARY OF INVENTION

Technical Problem

An object of the present invention is, in the case when a specific substance that has expressed on the cells to be detected in a liquid sample is to be specifically stained, to provide a convenient cell staining method by which the damage and loss (flow out) of the cells in the collected sample are prevented and the time has been shortened in a procedure for staining the cells in the liquid sample. Furthermore, another object of the present invention is to provide a sample collection tube that is suitable for use in the above-mentioned cell staining method.

Solution to Problem

The present inventors have considered procedures for staining cells in a liquid sample, and found that there is no problem in a permeabilization treatment of cells and a labeling treatment of a specific substance possessed by the cells after an immobilization treatment of the cells, even if an immobilization treating agent is not removed after the immobilization treatment, and also found that the step of the immobilization treatment of the cells and the step of the permeabilization of the cells can be performed in one step. As a result, the numbers of frequency of the centrifugation and washing of the cells were decreased, the damage and loss (flow out) of the cells in the sample were prevented, and the shortening of the time and the simplification in the procedure of cell staining were able to be achieved, whereby the present invention was completed. Furthermore, the present inventors found that a cell staining procedure can be performed more conveniently by performing a step of a labeling treatment of a specific substance possessed by the cells and the above-mentioned steps in one step, and completed the present invention.

Specifically, the present invention encompasses the following matters.

[Item. 1] A method for specifically staining a specific substance possessed by cells in a sample, including performing the following steps in one step:

(A) a step of performing an immobilization treatment of the cells; and (B) a step of performing a permeabilization treatment of the cells.

[Item. 2] The method according to Item. 1, further including performing (C) a step of performing a labeling treatment of the specific substance possessed by the cells, in addition to the steps (A) and (B), in one step.

[Item. 3] The method according to Item. 1 or 2, wherein the sample is blood.

[Item. 4] The method according to anyone of Items. 1 to 3, wherein, in the step (A), the immobilization treatment is performed on the cells by using formaldehyde as an immobilizer, and the concentration of the immobilizer is from 0.01 to 1.0% by volume with respect to the volume of the sample.

[Item. 5] The method according to any one of Items. 1 to 4, wherein, in the step (B), the permeabilization treatment is performed on the cells by using a surfactant as a permeabilization agent.

[Item. 6] The method according to Item. 5, wherein the surfactant contains at least one selected from the group consisting of Triton-100, Tween 20, Saponin, Digitonin, Leucoperm and NP-40, and the treatment is performed at the concentration of the surfactant of from 0.01 to 0.5% by volume with respect to the volume of the sample.

[Item. 7] The method according to any one of Items. 1 to 6, wherein, in the step (C), the labeling treatment of the specific substance possessed by the cells is performed by using a substance that specifically traps the specific substance, and a fluorescent-labeled body.

[Item. 8] The method according to Item. 7, wherein the substance that specifically traps the specific substance is an antibody.

[Item. 9] A sealable sample collection tube having an openable and closable opening, for storing a collected sample and for simultaneously performing immobilization and permeabilization of cells contained in the sample and labeling of a specific substance possessed by the cells, wherein (1) a flexible plate-like body is housed in a state that the flexible plate-like body is sandwiched between inner walls of an intermediate part of the sample collection tube, and (2) an immobilizer for the cells, a permeabilization agent for the cells, and a substance for specifically labeling the specific substance possessed by the cell are housed in the sample collection tube so that they are not brought into contact with one another.

[Item. 10] The sample collection tube according to Item. 9, wherein the immobilizer is attached to at least a part of the flexible plate-like body, the substance for specifically labeling the specific substance is attached to at least a part of the inner wall of the sample collection tube, and the permeabilization agent is housed in the sample collection tube.

[Item. 11] The sample collection tube according to Item. 9 or 10, wherein the sample is blood, and an anticoagulant is further attached to at least a part of the flexible plate-like body so that the anticoagulant is not brought into contact with the immobilizer, the permeabilization agent and the substance for specifically labeling the specific substance.

Advantageous Effects of Invention

According to the method of the present invention, in the case when a specific substance that has expressed on cells to be detected in a liquid sample is specifically stained, the damage and loss (flow out) of the cells in the collected sample can be prevented by reducing the number of frequency of washing of the cells, and consequently, the examination accuracy of the cell diagnosis can be improved. Furthermore, according to the method of the present invention, a convenient method for cell staining in which the time has been shortened can be provided in a method for staining cells in a liquid sample.

Furthermore, according to the sample collection tube of the present invention, the immobilization and permeabilization of the cells in the sample and the labeling of the specific substance possessed by the cells can be conveniently performed within a short time at the same time, and the damage and loss (flow out) of the collected cells in the sample can also be prevented. Furthermore, according to the sample collection tube of a preferable aspect of the present invention, an anticoagulation treatment of blood can also be simultaneously performed with intending for blood samples.

BRIEF DESCRIPTION OF DRAWINGS

FIG. 2 is an image obtained by conducting fluorescence staining on cells in blood to which MCF-7 cells (breast cancer cells) had been added, and performing a fluorescence observation on the cells under a microscope in Comparative Example (a cell staining process by a conventional method).

FIG. 3 is an image obtained by conducting fluorescence staining on cells in blood to which MCF-7 cells (breast cancer cells) had been added, and performing a fluorescence observation on the cells under a microscope in Example 1 (a cell staining method in which an anticoagulation treatment, an immobilization treatment, a permeabilization treatment and a labeling treat are performed in one step).

FIG. 4 is an image obtained by conducting fluorescence staining on cells in blood to which MCF-7 cells (breast cancer cells) had been added, and performing a fluorescence observation on the cells under a microscope in Example 2 (an example combined with a density gradient centrifugation process).

DESCRIPTION OF EMBODIMENTS

Figure 1:
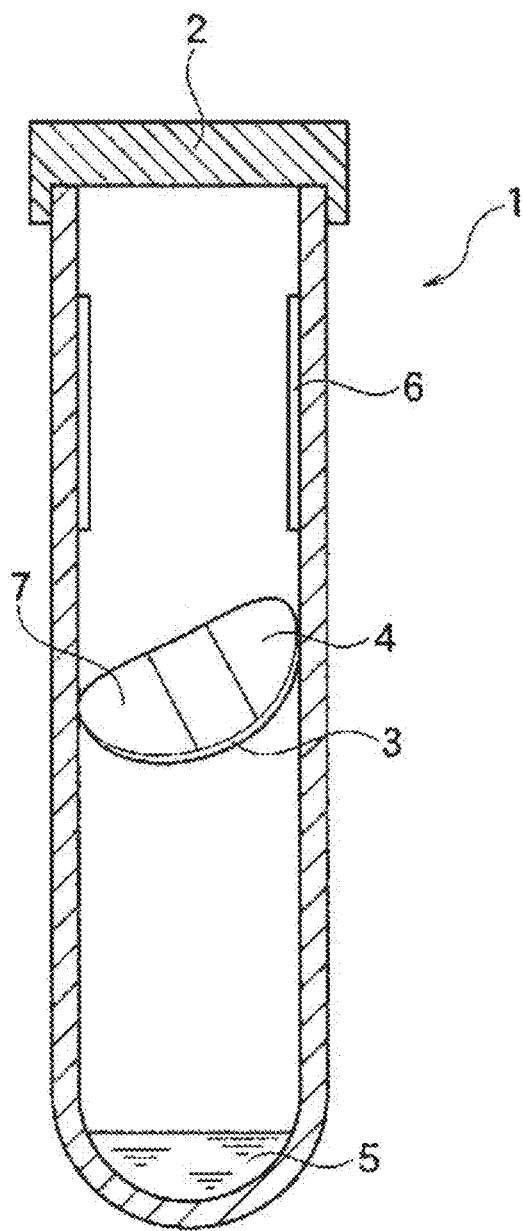
FIG. 1 is a cross-sectional view showing an aspect of the sample collection tube of the present invention.

1. Cell Staining Method of Present Invention

The cell staining method of the present invention is "a method for specifically staining a specific substance possessed by cells in a sample, including performing the following steps in one step:

(A) a step of performing an immobilization treatment of the cells; and (B) a step of performing a permeabilization treatment of the cells."

(Sample)

The sample intended by the present invention is a sample containing cells which has been collected from a human or an animal. In view of the effect of the present invention, a preferable sample intended by the present invention is a liquid sample. Typical examples of such sample are blood (including blood serum and plasma) and urine. Furthermore, also in the case when cells that have peeled from a living body are intended, the liquid sample can be formed by preparing a cell suspension liquid according to a predetermined method.

In performing the cell staining method of the present invention, where necessary, the collected sample may be subjected to an operation for obtaining a fraction containing cells to be detected from a sample (this is referred to as an operation for obtaining a fraction of cells to be detected). Examples of the operation for obtaining a fraction of cells to be detected include, in the case of a blood sample, performing an anticoagulation treatment, and obtaining a fraction of cells to be detected, such as a fraction free from erythrocytes, by density gradient centrifugation, and the like. The operation to obtain a fraction of cells to be detected is generally performed before the immobilization treatment of the cells, and where necessary, the operation can also be performed between the immobilization treatment of the cells and the permeabilization treatment of the cells.

(Specific Substance Possessed by Cells)

The staining method of the present invention is a method for specifically staining a specific substance that is possessed by the cells to be detected, and can be performed, for example, for judging whether or not a sample contains cells to be detected, and for observing the cells contained in the sample. In this case, the specific substance to be stained may be selected so as to conform with the purpose depending on the cells to be detected, in a similar manner to that generally conducted. For example, in order to detect prostate cancer cells, a prostate-specific antigen (prostate specific antigen, PSA) can be specifically stained, and in order to observe cancer cells as a subject, a specific cytokeratin that is selected depending on the expression in the cancer cells can be specifically stained.

(Cell Staining Method)

In the method for specifically staining a specific substance possessed by cells in a sample in the present invention (hereinafter simply referred to as a cell staining method), the immobilization treatment and permeabilization treatment of the cells in the collected sample are performed in one step. Specifically, for example, in the case when the sample is blood, an immobilization treatment and a permeabilization treatment of the blood are performed in one step, and a step of specifically conducting a labeling treatment of the above-mentioned specific substance is then performed, and preferably, the sample is then washed, and can be observed by a microscope or the like. In this case, after the collection of the sample, it is also possible to firstly perform the anticoagulation treatment of the blood, and then perform the above-mentioned immobilization treatment and permeabilization treatment in one step, or the anticoagulation treatment of the blood, the immobilization treatment of the cells and the permeabilization treatment of the cells in this case can also be performed in one step. Furthermore, as one of the preferable aspects of the present invention, the above-mentioned immobilization treatment of the cells, the above-mentioned permeabilization treatment of the cells and the above-mentioned step of specifically labeling the specific substance can be performed in one step (furthermore, the above-mentioned anticoagulation treatment of the blood can also be performed in one step).

"Performed in one step" herein means that "a series of the treatments in the step are performed without performing washing to remove the immobilizer added" or "a series of the treatments in the step are performed without performing washing to remove the immobilizer and permeabilization agent added". Generally, in the staining of cells, an immobilization treatment on cells is performed, and washing (washing for removing the immobilizer) is then performed, and a permeabilization treatment of the cells, and where necessary, washing (washing for removing the permeabilization agent) is then performed, and a labeling treatment is performed. The washing method in this case is performed by adding other washing liquid such as phosphate buffer brine to the sample containing cells, and performing a centrifugation treatment to thereby remove the supernatant. However, in the present invention, in the case of an aspect in which the immobilization treatment of the cells and the permeabilization treatment of the cells are performed in one step, washing for removing the immobilizer as mentioned above is not performed during these treatments. Furthermore, in the present invention, in the case of an aspect in which the immobilization treatment of the cells, the permeabilization treatment of the cells and the labeling treatment of the specific substance are performed in one step, washing for removing the immobilizer and permeabilization agent as mentioned above is not performed during these treatments. In addition, as mentioned above, the operation for obtaining the above-mentioned fraction of the cells to be detected fraction may be performed in the above-mentioned one step, for example, between the immobilization treatment of the cells and the permeabilization treatment of the cells as necessary.

In addition, as mentioned above, as one of the preferable aspects of the present invention, the labeling treatment of the specific substance and the anticoagulation treatment of the blood can be performed in the same one step besides immobilization treatment of the cells and the permeabilization treatment of the cells, and in this case, preferably, the background noise can be reduced if washing for removing the unreacted labeled body that has not bound to the specific substance is performed after the labeling treatment on the specific substance, and an observation is conducted under a microscope or the like.

The immobilization treatment of the cells and the permeabilization treatment of the cells mentioned above are performed by adding the immobilizer and the permeabilization agent to the sample, and leaving the sample for generally from 10 minutes to 1 hour at room temperature. In this case, in the case when these treatments are performed in one step together with the labeling treatment of the specific substance and the anticoagulation treatment of the blood, a substance that specifically traps the specific substance, a labeled body (for example, an antibody to which a labeled body has bound) and an anticoagulant can also be added in combination, and the treatments in this case are performed by leaving generally for from 10 minutes to 1 hour at room temperature.

(Anticoagulant)

When blood comes out of a body, the liquid turns into a gel form, and blood coagulation occurs. Therefore, in the case when the sample is blood, when it is necessary to prevent blood coagulation depending on the purpose of an examination, an anticoagulant is added to the sample after the collection of the sample. The anticoagulant used in the present invention in the case when the sample is blood is not especially limited, and examples include generally used anticoagulants such as ethylenediamine triacetate (EDTA), diethylenetriamine pentaacetate (DTPA), 1,2-diaminocyclohexane triacetate (DCTA), ethylenebis(oxyethylenenitrilo) triacetate (EGTA), heparin species such as heparin, heparin sulfate and low molecular weight heparin, citric acid, oxalic acid, and the like. The addition concentration of these anti-blood coagulation agents may be as generally performed.

(Immobilizer)

The immobilization treatment of the cells is a treatment that is conducted for the purposes of delaying the self-decomposition and decay of the cells, and retaining the form and antigenicity. The immobilizer used in the present invention is not especially limited, and generally-used immobilizers such as aldehydes (for example, formaldehyde, glutaraldehyde, glyoxal and the like) and alcohols (for example, ethanol, methanol and the like) can be used. Furthermore, for example, a formaldehyde-donating form (also referred to as a formaldehyde donor or a FA donor) or the like, which itself does not directly react as an immobilizer, but releases an immobilizer such as formaldehyde by undergoing hydrolysis or the like, can also be used as the immobilizer.

The aldehydes are crosslinking agents that form a covalent bond between an aldehyde group and a specific amino acid, and can suppress an enzymatic activity by stabilizing a protein structure and gelling a cell protoplasm. The alcohols can modify proteins to allow them to precipitate.

The addition concentration of these immobilizers may also be as generally conducted, and in the case when the sample is blood and formaldehyde is used as the immobilizer, it is preferable to perform the immobilization treatment by adding formaldehyde to the sample so as to be 0.01 to 1.0% by volume with respect to the volume of the sample so as to prevent the changing of the characteristics of the blood.

(Permeabilization Agent)

The permeabilization treatment of the cells is a treatment to increase the permeability of cell membranes so as to, for example, bring the specific substance possessed by the cells (for example, an antigen in the cells) into contact with a substance that traps this specific substance (for example, an antibody). The permeabilization agent used in the present invention is not especially limited. The permeabilization treatment can be performed by adding a generally-used surfactant such as Triton X-100, Tween 20, Saponin, Digitoni, Leucoperm or NP-40 to the sample at a generally-performed concentration, for example, from 0.01 to 0.5% by volume with respect to the volume of the sample.

(Labelling Treatment)

The method for the labeling treatment of the specific substance possessed by the cells in the present invention is not especially limited as long as it is a method that conforms to the purpose depending on the cells and the specific substance to be labeled, and is generally performed by using a substance that specifically traps the specific substance and a labeled body. Examples of the method for trapping the specific substance in this case include an antigen-antibody process in which the specific substance possessed by the cells is deemed as an antigen, and an antibody that specifically binds to the specific substance is used, a method in which, in the case when the specific substance has a sugar chain, lectin, which specifically binds to the sugar chain, is used, and the like.

As the labeling treatment, for example, a method for labeling the specific substance by using an antibody to which a labeled body has bound (a primary antibody process), a method in which the specific substance and a primary antibody are firstly bound, and a secondary antibody bound to a labeled body is then bound to the primary antibody (a sandwich process), and the like can be used.

The labeled body is also not especially limited as long as it is a labeled body that conforms to the purpose depending on the examination thereof, and generally-used labeled bodies such as a fluorescent pigment, an enzyme-coenzyme, a chemical luminescent substance and the like can be used. In this case, in order to detect a trace amount of the specific substance possessed by the cells with a high sensitivity, it is preferable to use a fluorescent pigment as the labeled body.

After the above-mentioned labeling treatment has been performed, it is preferable that the labeled body that has not bound to the above-mentioned specific substance is removed by centrifugation washing or the like, and an observation is then conducted under a microscope or the like.

2. Sample Collection Tube of Present Invention

The sample collection tube of the present invention is "a sealable sample collection tube having an openable and closable opening, for storing a collected sample and for simultaneously performing immobilization and permeabilization of cells contained in the sample and labeling of a specific substance possessed by the cells, wherein (1) a flexible plate-like body is housed in a state that the flexible plate-like body is sandwiched between inner walls of an intermediate part of the sample collection tube, and (2) an immobilizer for the cells, a permeabilization agent for the cells, and a substance that specifically labels the specific substance possessed by the cell are housed in the sample collection tube so that they are not brought into contact with one another".

The sample collection tube of the present invention encloses the immobilizer, the permeabilization agent and the substance that specifically labels the specific substance possessed by the cells (a substance and a labeled body that specifically trap the specific substance) in not a state that the respective substances are mixed, i.e., a mixed state, but are housed individually and separately. Furthermore, in the case when the sample is blood, as a preferable aspect of the sample collection tube of the present invention, the sample collection tube further houses an anticoagulant besides the above-mentioned substances, separately from the other treating agent and the like (the treating agent and the like in this specification mean "the immobilizer, the permeabilization agent, and the substance that labels the specific substance" or "the anticoagulant, the immobilizer, the permeabilization agent, and the substance that labels the specific substance").

After the liquid sample is collected, the openable and closable opening is opened, the sample is put into the sample collection tube of the present invention, the opening is closed, and the sample collection tube is upset several times to mix the sample and the above-mentioned treating agent and the like, and the mixture is left at generally for 10 minutes to 1 hour at room temperature, whereby the immobilization and permeabilization of the cells in the sample, and the labeling of the specific substance can be performed in one step. Furthermore, in the above-mentioned preferable aspect of the sample collection tube of the present invention, in the case when the sample is blood, the anticoagulation of the blood can also be performed in one step in addition to the immobilization and permeabilization of the cells, and the labeling of the specific substance.

(Material of Sample Collection Tube)

As the material of the sample collection tube of the present invention, a generally-used material can be used depending on the sample to be collected, and for example, thermoplastic resins such as polyesters such as polyethylene telephthalate and copolymerized polyethylene telephthalates, acrylic resins such as polyacrylonitrile, polymethylmetaacrylate and polymetaacrylic acid, polyolefins such as polypropylene and polyethylene, polyvinyl chloride, polyamides such as nylons, and polystyrenes, and inorganic materials such as glass can be used.

(Flexible Plate-Like Body)

In the sample collection tube of the present invention, a flexible plate-like body is housed in the state that it is sandwiched between inner walls of an intermediate part of the sample collection tube so that the flexible plate-like body is not be loosened in the sample collection tube by oscillation and the like. By this flexible plate-like body, the inner part of the sample collection tube is divided into two spaces. Furthermore, in the present invention, at least a part of the treatment agent and the like is housed by attaching it to the flexible plate-like body or the inner walls of the sample collection tube as mentioned below, thereby the individual immobilizer, permeabilization agent and substance for labeling the specific substance such as the treatment agent (preferably, as well as the anticoagulant) can be housed not in a mixed state but respectively in a separated state.

It is preferable that the flexible plate-like body has a larger specific gravity than the specific gravity of the sample so that the flexible plate-like body sinks in the sample when the sample and the treating agent and the like are mixed by putting the liquid sample into the sample collection tube of the present invention and upsetting the sample collection tube several times.

The flexible plate-like body may be anyone as long as it is a plastic film, and for example, stretched PET films, nylon films, filler-filled PP films, filler-filled PE films, plastic-laminated aluminum foil films and the like are used, and where necessary, surface treatments such as a plasma treatment and embossing may be conducted. The flexible plate-like body may be a flexible plate-like body obtained by processing a nonwoven fabric into a plate-like body, and polyesters, nylons, rayons and combinations thereof are used as the material for the nonwoven fabric. Furthermore, the flexible plate-like body may be formed by superposing a nonwoven fabric on the above-mentioned film. The shape of the flexible plate-like body is such that the flexible plate-like body can be sandwiched between the inner walls according to the shape of the sample collection tube. For example, in the case of a cylindrical sample collection tube, the flexible plate-like body has a circular shape having such a diameter that the flexible plate-like body can be sandwiched between the inner walls.

As mentioned below, the flexible plate-like body can be easily inserted in the sample collection tube by utilizing the flexibility thereof, after the treating agent and the like are attached to the inner wall or flexible plate-like body so that the treating agent and the like are housed in the sample collection tube. In this case, for example, in the case when the permeabilization agent is directly put into the sample collection tube housed without attaching to the inner wall and the flexible plate-like body, the flexible plate-like body is sandwiched at a place that is apart from the permeabilization agent, so that the permeabilization agent and the flexible plate-like body are put into a state that they are not in contact with each other.

(Attaching of Treating Agent and the Like to Inner Wall or Flexible Plate-Like Body)

The treating agent and the like are preferably attached to the inner walls of the sample collection tube or the flexible plate-like body so that they are housed respectively and separately. In order to attach the treating agent and the like to the inner walls and the like, it is preferable to mix the treating agent and the like with a water-soluble polymer that shows adhesiveness, and attach the mixture. Furthermore, the adhesion site may be attached to any site in any way as long as the vicinity of the opening of the tube is avoided. The treating agent and the like may be attached to either the whole surface or a part of the inner walls of the sample collection tube or the flexible plate-like body. In the case when two kinds such as the immobilizer and the anticoagulant are respectively attached to the flexible plate-like body, the immobilizer and the anticoagulant are attached to places that are apart from each other. As the adhesion method, application is conducted by a method such as spray coating or dipping, and drying is conducted by a method such as air drying, heat drying or drying under a reduced pressure. Examples of the above-mentioned water-soluble polymer include water-soluble substances such as polyvinyl pyrrolidone and polyvinyl alcohol, water-soluble cellulose derivatives such as carboxymethyl cellulose, hydroxyethyl cellulose, hydroxypropyl cellulose, ethylhydroxyethyl cellulose, ethyl cellulose, methyl cellulose, carboxymethyl ethyl cellulose and hydroxypropyl methyl cellulose, water-soluble acrylic acid derivatives such as 2-hydroxyethylacrylate and 2-hydroxypropylacrylate, mixtures of various water-soluble proteins such as gelatin and starch.

Furthermore, in order to attach the substance that labels the specific substance (the substance that specifically traps the specific substance, and the labeled body such as a labeled antibody) to the inner walls, for example, a method for allowing a plastic plate to adsorb an antibody by utilizing a hydrophobic interaction, which is generally performed in performing an ELISA (an enzyme immunoassay process), can be used. Specifically, for example, a labeled antibody that has been diluted with a sodium bicarbonate buffer (0.1 M, pH 9.6) to 2 to 5 µg/ml is brought into contact with a coating region (a region on the inner wall to be attached), and reacted at room temperature for 3 hours (or at 4° C. overnight). The solution of the labeled antibody that has not been adsorbed is collected, washed with a phosphate buffer saline (PBS) containing 0.05% Tween, and further washed with PBS. In this case, in order to promote the labeled antibody to move away from the inner wall and be mixed with the sample when the sample is put into the collection tube, where necessary, sodium chloride or the like may further be added after the sample has been put into the sample collection tube to thereby increase the salt concentration.

In addition, in the case when it is difficult to attach the permeabilization agent as a liquid to the inner walls and the like, for example, as in the permeabilization agent, the permeabilization agent is directly put into the sample collection tube, and the flexible plate-like body is sandwiched at a portion that is apart from the permeabilization agent, as mentioned above.

EXAMPLES

The present invention will further be explained below in detail with referring to Examples, but the present invention is not limited to these.

Comparative Example 1

(Cell Staining Process by Conventional Process)

A blood collection tube containing EDTA (ethylenediamine triacetate) as an anticoagulant was used. MCF-7 cells (breast cancer cells, ATCC HTB-22) were added to the collected blood, and used as a model of blood circulating cancer cells. The blood was diluted to twice with a solution of PBS (phosphate buffer saline) containing 0.5% BSA (bovine blood serum albumin), 4 mL of which was superposed on a tube to which 3 mL of a separation medium for density gradient centrifugation (Ficoll, specific gravity:

1.077) had been put in advance, and centrifugation was performed at room temperature at 400 g for 40 minutes. After the centrifugation, all of the layers other than the erythrocyte layer were collected, PBS was newly added thereto, centrifugation washing was performed three times, and immobilization was performed by using a 20% neutral buffer formalin liquid (Wako Pure Chemical). The 20% neutral buffer formalin liquid was diluted with PBS so that the formaldehyde became 4%, and reacted at room temperature for 10 minutes. After the reaction, centrifugation washing was performed three times with PBS, and a permeabilization treatment and blocking were conducted with PBS containing 0.1% Tween 20 and 3% BSA, and a FITC (fluorescein isothiocyanate)-labeled anticytokeratin antibody (Becton Dickinson) and a PE (phycoerythrin)-labeled anti-CD45 antibody (Beckman Coulter) were added, and a reaction was conducted for 1 hour. Centrifugation washing with PBS containing 0.1% of Tween 20 were conducted three times, nucleus staining by Hoechst (Hoechst 33342 (Dojindo Laboratories)) was performed for 5 minutes, and centrifugation washing was performed again with PBS containing 0.1% of Tween 20. A part of this cell suspension liquid was subjected to a fluorescence observation under a microscope by a hemacytometer.

The result is shown in FIG. 2. It was confirmed that a sample obtained by removing erythrocytes by a density gradient centrifugation process from blood obtained by spiking (adding) cancer cells to the blood can be stained by a general cell immunostaining process. The cancer cells reacted with the anticytokeratin antibody, and the leucocytes reacted with the anti-CD45 antibody, respectively.

Example 1

(Cell Staining Process in which Anticoagulation Treatment, Immobilization Treatment, Permeabilization Treatment and Labeling Treatment are Performed in One Step)

Using a Cyto-chex blood collection tube (manufactured by Streck) as a blood collection tube for incorporating an anticoagulant (EDTA) and a cell immobilizer (this is presume to be a formaldehyde donor such as diazolidinylurea or imidazolidinylurea from the analysis result), and MCF-7 cells (breast cancer cells) were added to the collected blood and used as a model of blood circulating cancer cells. Tween 20 was added to a part thereof, 200 µL, so as to be 0.1%, and a FITC labeled anticytokeratin antibody, a PE labeled anti-CD45 antibody and Hoechst were added thereto, and a reaction was conducted for 30 minutes. A fluorescence observation was performed on apart thereof under a microscope by a hemacytometer.

The result is shown in FIG. 3. An equivalent staining result to that in a conventional general staining process was able to be obtained for spike blood that is similar to that in Comparative Example, by convenient operations in which immobilization, permeabilization and an antigen-antibody reaction simultaneously progress, without separating hemocytes by centrifugation and separating blood foreign substances such as other proteins.

Example 2

(Example Combined with Density Gradient Centrifugation Process)

A blood collection tube containing EDTA as an anticoagulant (manufactured by Terumo) was used. MCF-7 cells (breast cancer cells) were added to the collected blood and used as a model of blood circulating cancer cells, and immobilization was performed by using a 20% neutral buffer formalin liquid (Wako Pure Chemical). The 20% neutral buffer formalin liquid was diluted with PBS and added so that the final concentration of the formaldehyde became 0.08% with respect to 3 mL of the blood, and the mixture was mixed by upsetting ten times. This blood was diluted to twice with PBS containing 0.5% BSA, 4 mL of the dilution was superposed on a tube to which 3 mL of a separation medium for density gradient centrifugation (Ficoll, specific gravity: 1.077) had been added in advance, and centrifugation was performed at room temperature at 400 g for 40 minutes. After the centrifugation, all of the layers other than the erythrocyte layer were collected, Tween 20 was added to a part thereof so as to be 0.1%, and a FITC-labeled anticytokeratin antibody, a PE-labeled anti-CD45 antibody and Hoechst were then added thereto, and a reaction was performed for 20 minutes. A fluorescence observation was performed on a part thereof under a microscope by a hemacytometer.

The result is shown in FIG. 4. In the case when the immobilization, permeabilization and labeling (an antigen-antibody reaction) were performed in one step by using similar spike blood to that in Comparative Example, a similar staining result to that in Example 1 was able to be obtained even a fraction of the cells to be detected (all of the layers other than the erythrocyte layers) was obtained by the density gradient centrifugation treatment between the immobilization and permeabilization, since centrifugation washing for removing the immobilization treating agent and permeabilization treating agent was not performed.

REFERENCE SIGNS LIST

1 Sample collection tube
2 Openable and closable opening
3 Flexible plate-like body
4 Immobilizer (attached to the flexible plate-like body)
5 Permeabilization agent (liquid)
6 Substance that labels specific substance (attached to the inner walls)
7 Anticoagulant (attached to the flexible plate-like body)

The invention claimed is:
1. A method for specifically staining a specific substance possessed by cells in a sample, comprising:
(1) adding a sample having cells possessing a specific substance to a sample collection tube,
the sample collection tube comprising:
(i) an immobilizer, a permeabilization agent, and a labeled probe for the specific substance possessed by the cells, wherein the immobilizer, the permeabilization agent, and the labeled probe are housed in the sample collection tube such that the immobilizer, the permeabilization agent, and the labeled probe are not in contact with one another, and
wherein the permeabilization agent is in liquid form and the immobilizer and the labeled probe are in dried form; and
(ii) a flexible plate body sandwiched between inner walls of the sample collection tube,
wherein the immobilizer is attached to at least a part of the flexible plate body and the labeled probe is attached to at least a part of an inner wall of the sample collection tube, the flexible plate body positioned within the sample collection tube between the labeled probe and the permeabilization agent, such that the immobilizer, the permeabilization agent and the labeled probe are not in contact with one another; and subsequently (2) mixing the sample with the immobilizer, the permeabilization agent, and the labeled probe inside the sample collection tube, wherein the mixing achieves, in a single step, (A) a step of performing an immobilization treatment of the cells, (B) a step of performing a permeabilization treatment of the cells, and (C) a step of performing a labeling treatment of the specific substance possessed by the cells.

2. The method according to claim 1, wherein the sample is blood.

3. The method according to claim 1, wherein the permeabilization agent is a surfactant.

4. The method according to claim 3, wherein the surfactant contains at least one selected from the group consisting of t-octylphenoxypolyethoxyethanol, polyoxyethylene (20) sorbitan monolaurate, saponin, digitonin, and nonylphenoxypolyethoxylethanol, and wherein the surfactant is present at a concentration of from 0.01 to 0.5% by volume with respect to the volume of the sample.

5. The method according to claim 1, wherein the labeled probe comprises a fluorescent label.

6. The method according to claim 5, wherein the labeled probe further comprises an antibody.

7. The method according to claim 2, wherein the labeled probe comprises a fluorescent label.

8. The method according to claim 2, wherein the permeabilization agent is a surfactant.

9. The method according to claim 4, wherein the labeled probe comprises a fluorescent label.

10. The method according to claim 7, wherein the premeabilization agent is a surfactant.

11. The method according to claim 3, wherein the labeled probe comprises a fluorescent label.

* * * * *